(12) United States Patent
Momochi et al.

(10) Patent No.: US 6,257,348 B1
(45) Date of Patent: *Jul. 10, 2001

(54) CONTROL APPARATUS FOR DRILLING MACHINE AND DRILLING METHOD

(75) Inventors: Takeshi Momochi, Numazu; Haruhito Sugiyama, Gotemba; Masahito Shiozaki, Niigata; Michio Matumoto, Numazu; Makoto Sagara, Mishima, all of (JP)

(73) Assignee: Toshiba Kikai Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,373

(22) Filed: Feb. 2, 1999

(30) Foreign Application Priority Data

Feb. 2, 1998 (JP) .................................................. 10-021295

(51) Int. Cl.[7] .................................................... B23B 47/34

(52) U.S. Cl. .................. 173/1; 173/2; 173/4; 173/19; 408/1 R; 408/56

(58) Field of Search ................................ 173/1, 2, 4, 11, 173/19; 408/17, 11, 1 R, 56

(56) References Cited

U.S. PATENT DOCUMENTS

| | | | | |
|---|---|---|---|---|
| 2,768,539 | * | 10/1956 | Wollenhaupt et al. | 173/19 |
| 3,129,613 | * | 4/1964 | Burg | 173/19 |
| 3,637,318 | * | 1/1972 | Hayes | 408/17 |
| 3,854,837 | * | 12/1974 | Kreithen et al. | 408/17 |
| 4,052,132 | * | 10/1977 | Oates | 408/1 R |
| 4,350,212 | * | 9/1982 | Hirose | 408/17 |
| 4,624,607 | * | 11/1986 | Kato et al. | 408/1 R |
| 4,704,689 | * | 11/1987 | Asakura | 408/17 |
| 4,915,550 | * | 4/1990 | Arai et al. | 408/56 |
| 5,024,562 | * | 6/1991 | Arai et al. | 408/1 R |
| 5,066,171 | * | 11/1991 | Arai et al. | 408/17 |
| 5,857,814 | * | 1/1999 | Jang | 408/17 |

* cited by examiner

*Primary Examiner*—Scott A. Smith
(74) *Attorney, Agent, or Firm*—Pillsbury Winthrop LLP

(57) ABSTRACT

A control apparatus for a drilling machine and a drilling method capable of quick adaptation to drilling by drills of various diameters, especially drills of small diameters, and of improving cutting efficiency. The control apparatus includes a cutting condition setting unit for setting the cutting conditions in accordance with the depth of the hole being drilled and a control unit for controlling the rotary speed and movement position of the drill. The cutting condition setting unit defines the regions of the beginning part, the inner part, and the penetration part from the side close to the drill of the workpiece toward the depth direction of the hole of the workpiece in accordance with the depth of the hole when drilling a throughhole.

8 Claims, 15 Drawing Sheets

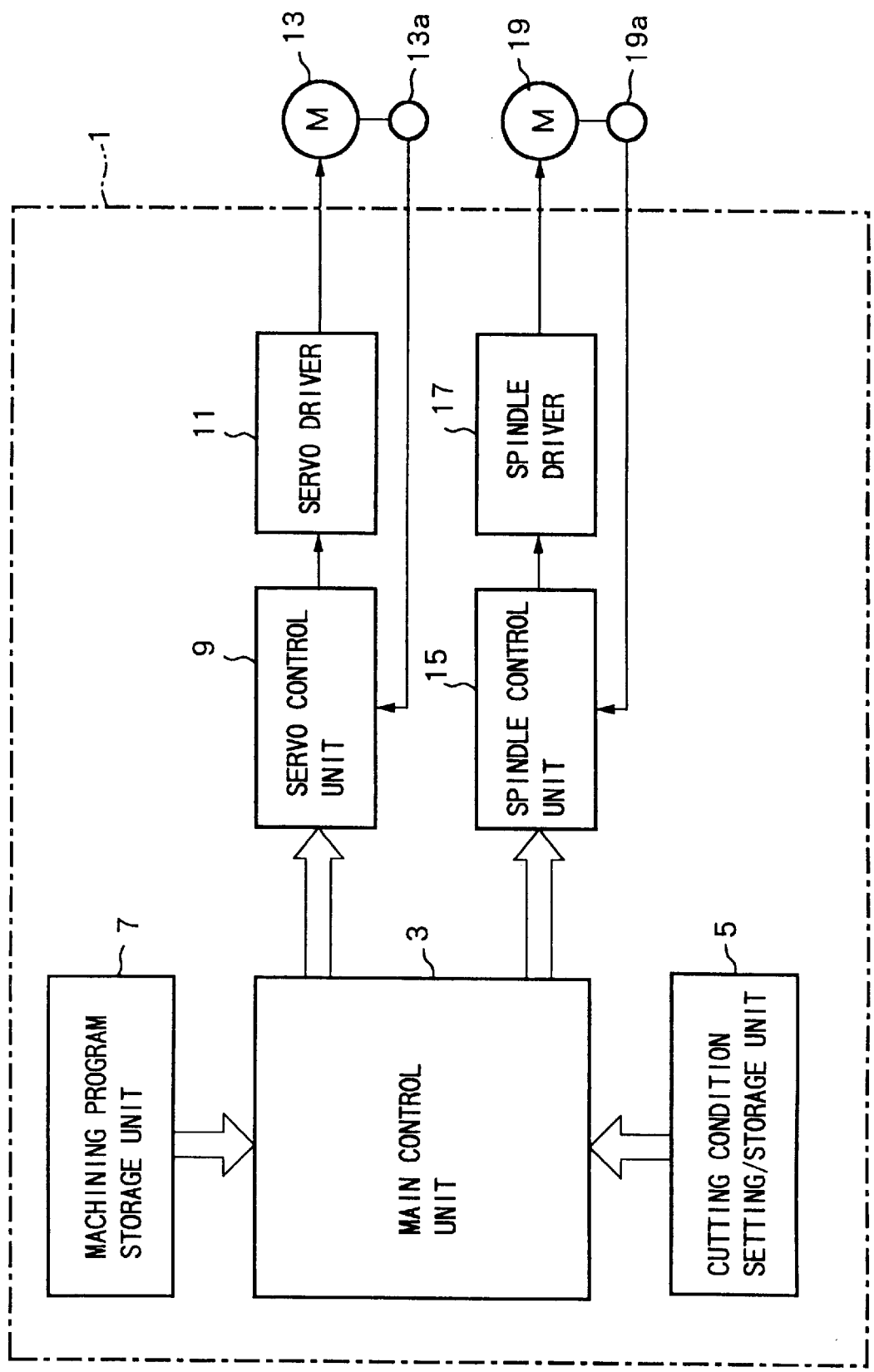

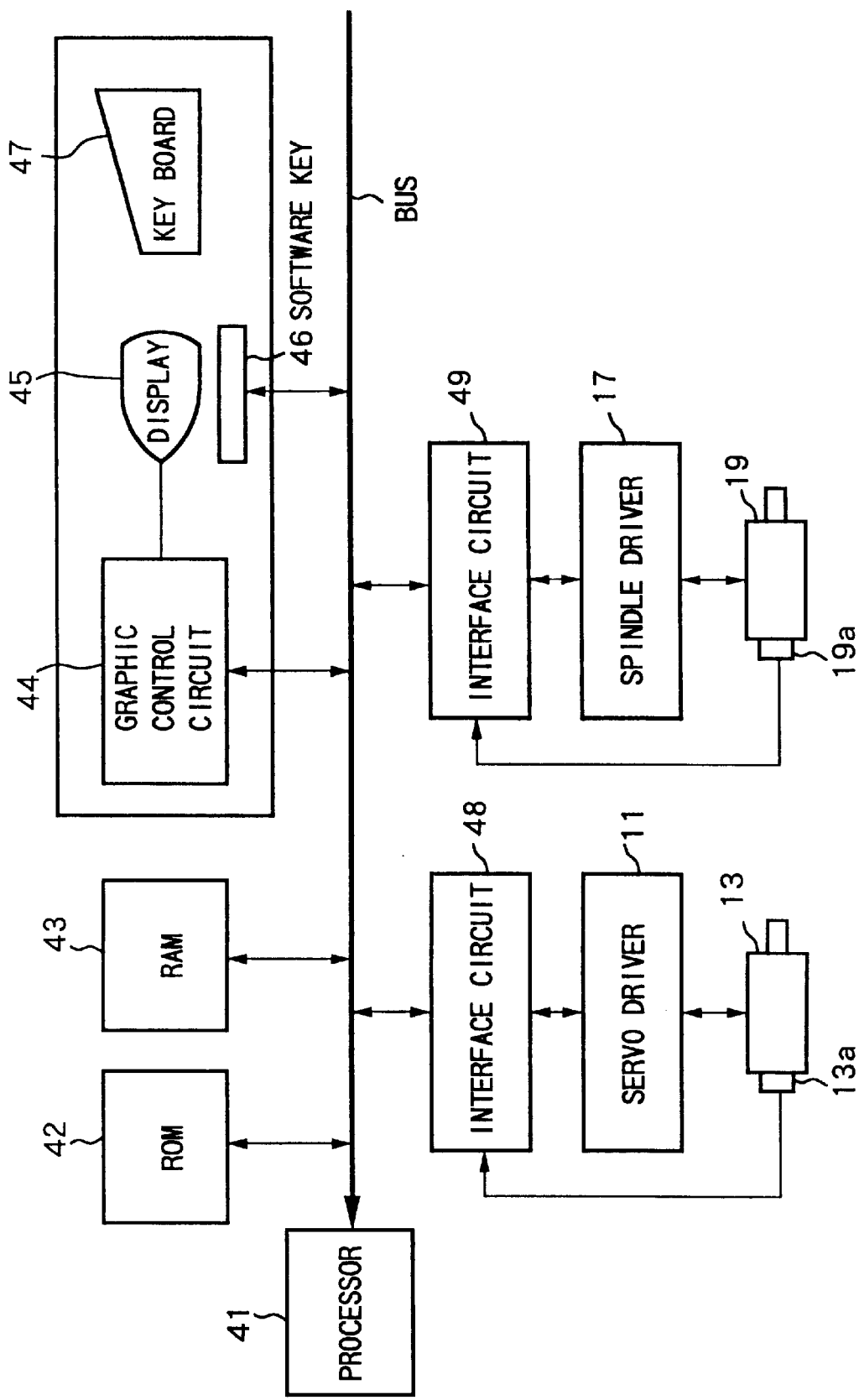

FIG.7

| NUMBER OF PARAMETERS | CONTENT | UNIT | CUTTING REGION |
|---|---|---|---|
| V35(500) | RAPID FEED SPEED | mm/min | |
| V41(0.1) | CLEARANCE | mm | |
| V39(0.5) | PROGRAM START POSITION | mm | |
| V40(3) | RETURN POSITION | mm | |
| V51(10000) | SPINDLE ROTARY SPEED OF REGION 1, 2 | rpm | |
| V53(5000) | SPINDLE ROTARY SPEED OF REGION 3 | rpm | |
| V54(0.5) | COEFFICIENT FOR DETERMINE V51 FROM V53 | | |
| V60(1) | DWELL TIME (COOLING DRILL) | second | |
| V52(12) | DWELL TIME (WAITING TIME FOR STABILIZATION OF SPINDLE ROTARY SPEED) | second | |
| V37(0.01) | ONE DEPTH OF CUT IN REGION 1 | mm | 1 |
| V33(5) | CUTTING FEED SPEED IN REGION 1 | mm/min | 1 |
| V42(-0.25) | POSITION FOR CHANGING CUTTING CONDITION BETWEEN REGION 1 AND 2 | mm | 1 |
| V36(0.01) | ONE DEPTH OF CUT IN REGION 2 | mm | 2 |
| V32(7) | CUTTING FEED SPEED IN REGION 2 | mm/min | 2 |
| V43(-0.95) | POSITION FOR CHANGING CUTTING CONDITION BETWEEN REGION 2 AND 3 | mm | 2 |
| V38(0.01) | ONE DEPTH OF CUT IN REGION 3 | mm | 3 |
| V34(3) | CUTTING FEED SPEED IN REGION 3 | mm/min | 3 |
| V45(-1.3) | FINAL CUTTING DEPTH POSITION | mm | |

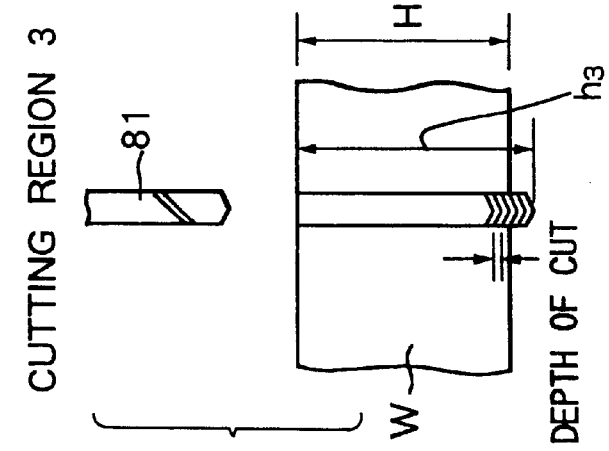
FIG.8A  FIG.8B  FIG.8C
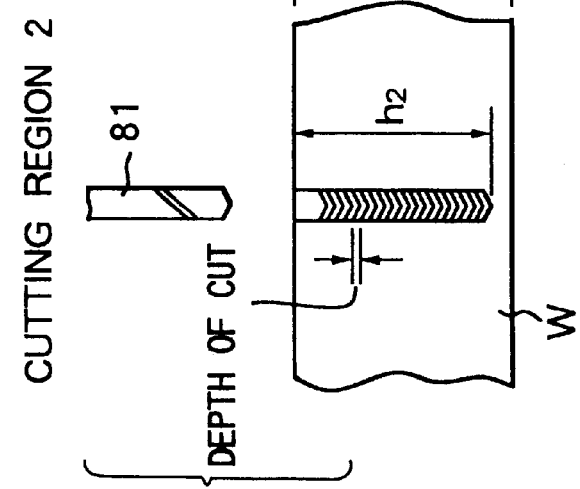
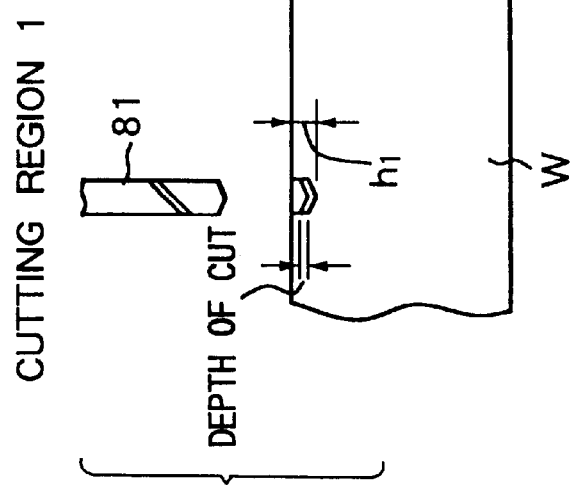

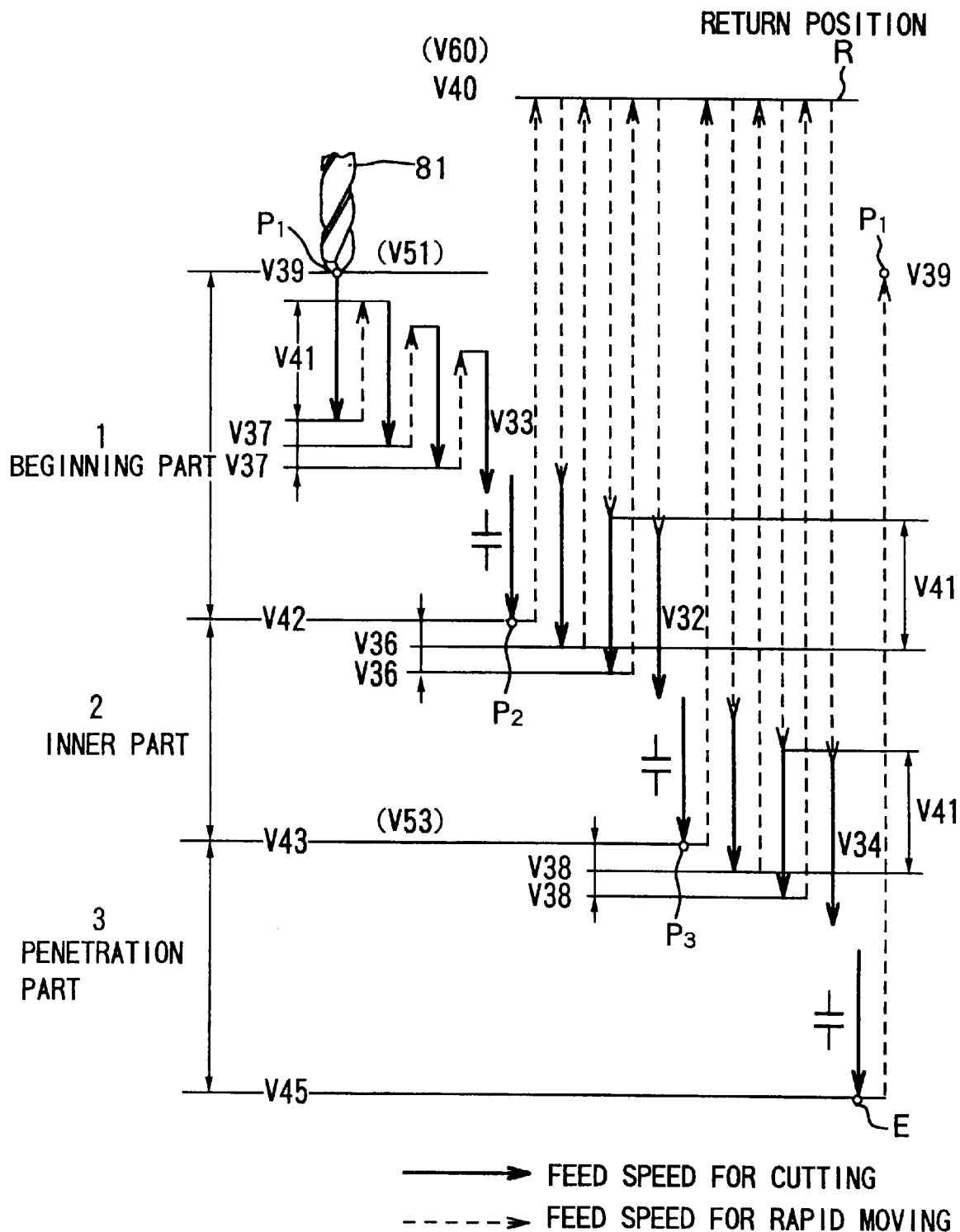

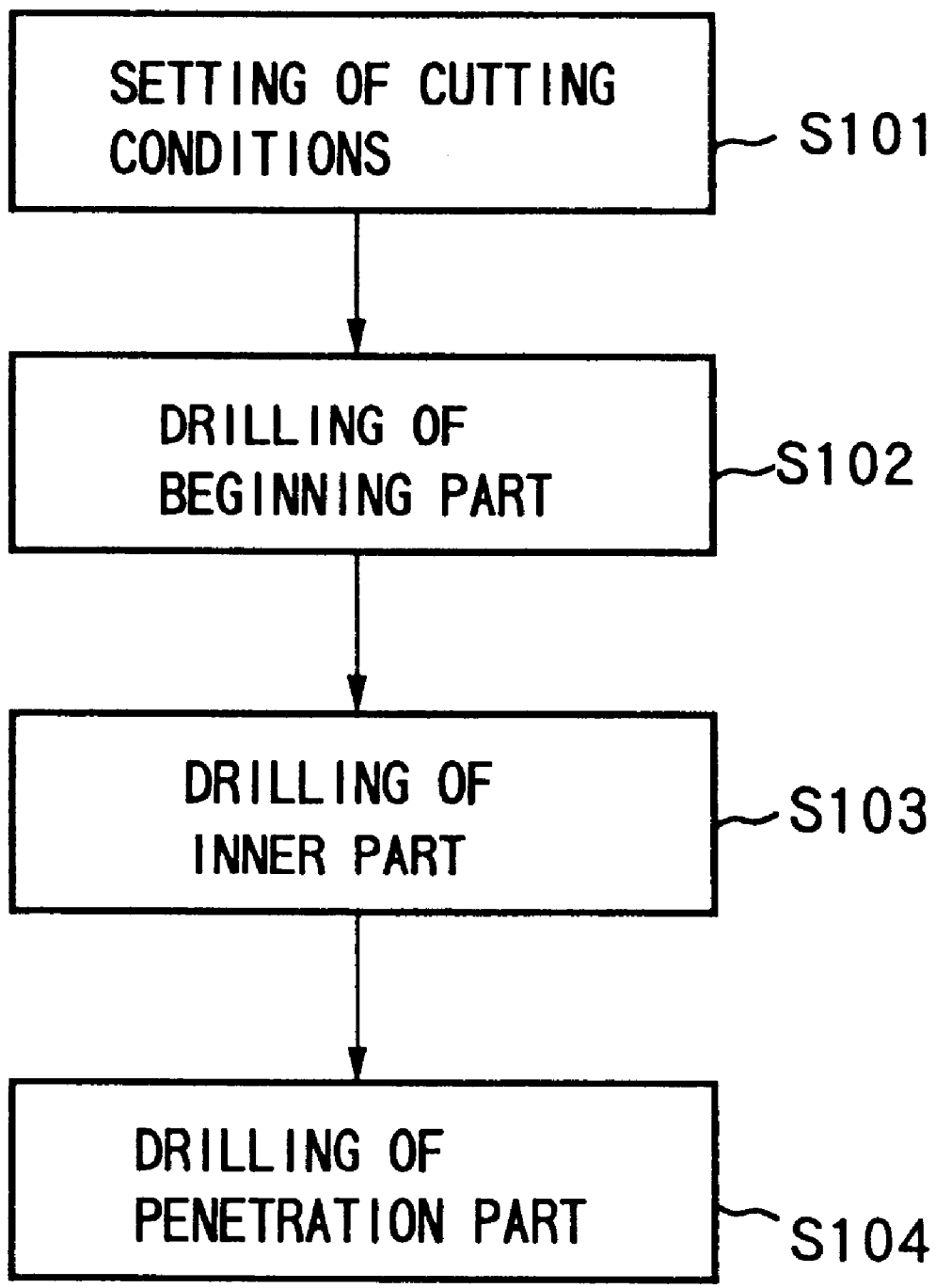

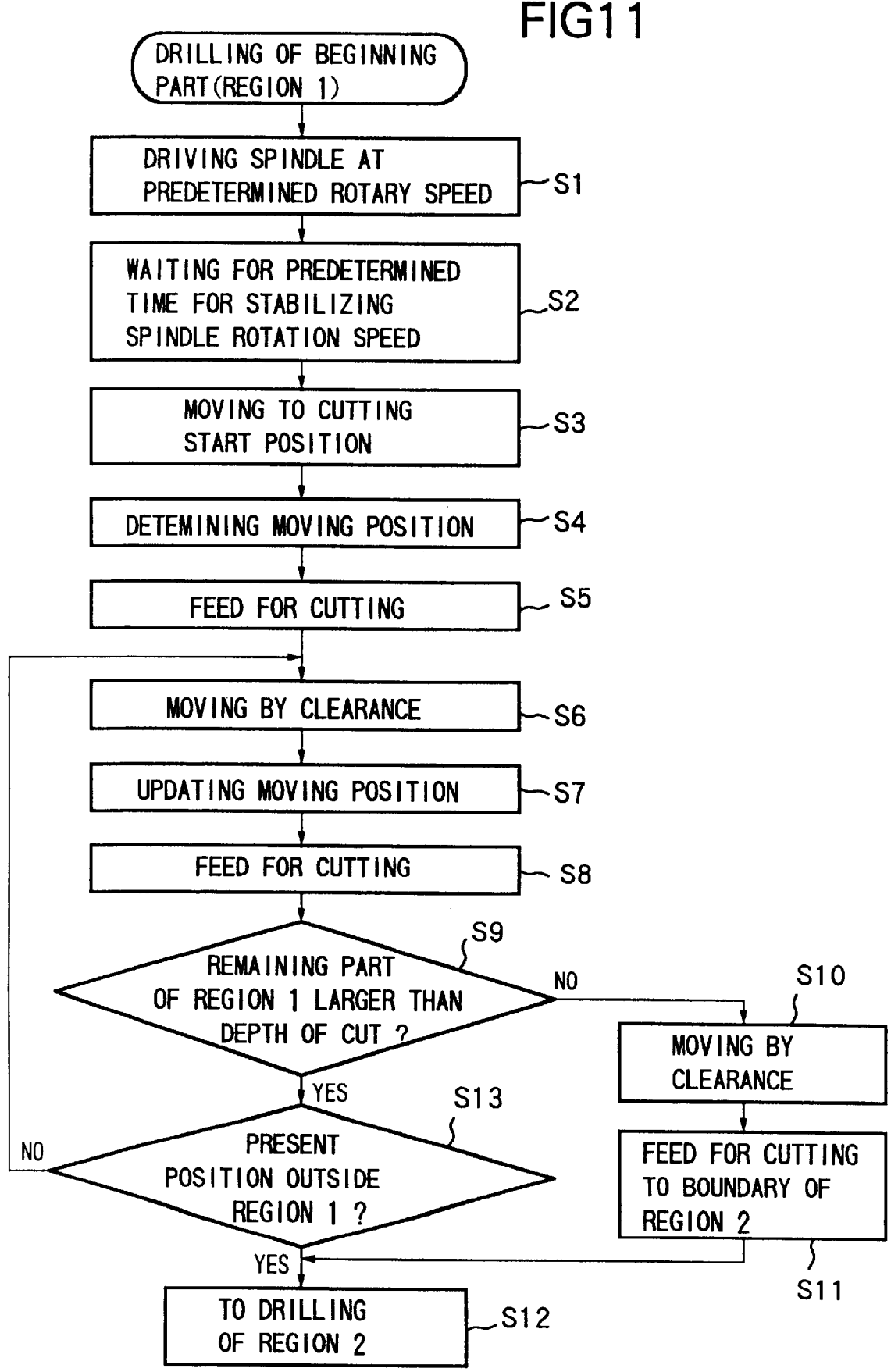

FIG.14

| | |
|---|---|
| S [V51] | —— P 1 |
| G04P [V52] | —— P 2 |
| G90G1Z [V52] F [V35] | —— P 3 |
| [V50 = 0] | —— P 4 |
| [V50 = V39 − V41 − V37] | —— P 5 |
| Z [V50] F [V33] | —— P 6 |
| N10 | |
| Z [V50 + V41] F [V35] | —— P 7 |
| [V50 = V50 − V37] | —— P 8 |
| Z [V50] F [V33] | —— P 9 |
| [1F,[V50 − V42], LE, V37, G0, 11] | —— P10 |
| [1F, V50, LE, V42, G0, 20] | —— P11 |
| [G0,− 10] | —— P12 |
| N10   Z [V50 + V41] F [V35] | —— P13 |
| Z [V42] F [V33] | —— P14 |
| [V50 = V42] | —— P15 |
| [G0, 20] | —— P16 |

FIG.15

| | | |
|---|---|---|
| N20 | G1Z [V40] F [V35] | —— P21 |
| | G04P [V60] | —— P22 |
| | [V50 + V41] | —— P23 |
| | [V50 = V50 − V36] | —— P24 |
| | Z [V50] F [V32] | —— P25 |
| | [1F,[V50 − V43], LF, V36, G0, 21] | —— P26 |
| | [1F, V50, LE, V43, G0, 30] | —— P27 |
| | [G0,− 20] | —— P28 |
| N21 | Z [V40] F [V35] | —— P29 |
| | Z [V50 + V41] | —— P30 |
| | Z [V43] F [V32] | —— P31 |
| | [V50 = V43] | —— P32 |
| | [G0, 30] | —— P33 |

FIG.16

|  |  |  |
|---|---|---|
|  | G1Z [V40]  F [V35] | —— P41 |
|  | [V60] | —— P42 |
|  | [V53 = V51 * V54] | —— P43 |
|  | S [V53] | —— P44 |
|  | G04P [V52] | —— P45 |
| N31 | Z [V40]  F [V35] | —— P46 |
|  | G04P [V60] | —— P47 |
|  | Z [V50 + V41] | —— P48 |
|  | [V50 = V50 − V38] | —— P49 |
|  | Z [V50]  F [V34] | —— P50 |
|  | [1F,[V50 − V45], LE, V38, G0, 32] | —— P51 |
|  | [1F, V50, LE, V45, G0, 40] | —— P52 |
|  | [G0,− 31] | —— P53 |
| N32 | Z [V40]  F [V35] | —— P54 |
|  | Z [V50 + V41] | —— P55 |
|  | Z [V45]  F [V34] | —— P56 |
|  | [G0, 40] | —— P57 |
| N40 | Z [V39]  F [V35] | —— P58 |
|  |  |  |
| N999 | Z M02 | —— P59 |

CONTROL APPARATUS FOR DRILLING MACHINE AND DRILLING METHOD

BACKGROUND OF THE INVENTION

1. Field of the Invention

The present invention relates to a control apparatus for a drilling machine and to a drilling method, more particularly relates to a control apparatus for a drilling machine and a drilling method applicable to drills of various diameters and especially suitable for drilling by small diameter drills.

2. Description of the Related Art

A workplece is drilled by a numerical control (NC) machine by attaching a drill to a spindle of the machine and moving it in a predetermined direction with respect to the workpiece fixed to a table while making the spindle rotate.

A "drill" is a cutting tool having a cutting edge on its tip and a flute on its body for cutting a hole. Here, FIGS. 1A and 1B show an example of a conventional method of drilling a workpiece. As shown in FIG. 1A. a center drill 102 is attached (mounted) to a spindle of a machining center of other NC machine tool. The center drill 102 is moved down to a workpiece W of a thickness H while rotating at a predetermined speed to form a prepared hole 103 in the workpLece W. This prepared hole 103 facilitates the start of the drilling of the workpLece W by the drill 104 for the main drilling.

Next., the center drill 102 is detached from the spindle. As shown in FIG. 1B, the drill 104 for the main drilling is attached to the spindle, rotated at a predetermined speed, and moved down to the workpiece W at a predetermined feed speed for cutting a hole 105 through the prepared hole 103 formed in the previous step.

At this time, the hole 105 is cut by the drill 104 by repeatedly moving the drill 104 down to the workpiece W to out it by a depth of cut S, moving the drill 104 outside of the hole 105, then again cutting by the depth of cut S. As a result of the above operation, a hole 105 is formed passing through the workpiece W of the thickness H. Note that the repeated cutting by the depth of cut S is for chip relief from the hole 105.

The above drilling method is performed by making an NC apparatus controlling the NC machine tool program execute an NC program which defines the speed of a spindle, the cutting feed speed, the depth of out S, the depth of the hole 105, and other factors.

In the above conventional drilling process, however, an NC program defining the depth of cut and the depth of the hole must be prepared for each different drilling process. Therefore, when drilling a variety of holes, troublesome work is involved and it is necessary to change the NC program to change the cutting conditions.

Note that the above drilling method was designed for forming holes having a large diameter, for example, a diameter larger than 0.5 mm. Therefore, various problems arise when applying small diameter drills of a diameter of less than 0.5 mm as they are to the above drilling method.

That is, when drilling by a small diameter drill, a small diameter drill will sometimes break when repeatedly cutting by a depth of cut S due to interference between the small diameter drill and the hole.

When drilling a through hole through a workpiece W by a small diameter drill, furthermore, the small diameter drill will sometimes easily shift from the center of the hole and break when passing through (breaking through) the workpiece W.

Furthermore, when using a small diameter drill to drill a hole through a workpiece W, the above prepared hole 103 is not formed in the workpiece W. that is, the hole is drilled by a single small diameter drill, so there is the danger of poor starting of drilling of the small diameter drill in the workpiece W.

Also, when the material of the workpiece W is a stainless steel or another heat resistant steel, the small diameter drill is heated during the cutting of the workplece W. This heat makes the small diameter drill more susceptible to breaking.

When forming a small diameter hole, therefore, it is therefore especially necessary to prepare an NC program designating the optimal cutting conditions for every drilling process.

SUMMARY OF THE INVENTION

An object of the present invention is to provide a control apparatus for a drilling machine and a drilling method enabling quite handling of drilling by drills of various diameters, especially drilling by small diameter drills, and enabling improvement of the cutting efficiency.

According to a first aspect of the present invention, there is provided a control apparatus for a drilling machine comprising a rotating means for rotating a drill; a moving means for making the drill move relative to a workpiece; a cutting condition setting means for defining setting a plurality of cutting regions of a hole in accordance with a depth of the hole and independently setting cutting conditions for each cutting region; and a control means for controlling the rotating means and the moving means in accordance with the cutting conditions.

Preferably, the cutting condition setting means has: a cutting region setting means for setting a plurality of cutting regions in accordance with the depth of the hole; a cutting feed speed setting means for independently setting cutting feed speeds of the drill for each cutting region; a non-cutting feed speed setting means for independently setting feed speeds of the drill for each cutting region; a depth of cut setting means for independently setting one depth of cut for each cutting region; an interference prevention condition setting means for preventing interference between the drill and the hole when cutting into the workpiece again after cutting by a predetermined depth of cut; and a drill rotary speed setting means for independently setting a rotary speed of the drill for each cutting region.

Alternatively, preferably, cutting condition setting means further has a cooling condition setting means for setting cooling conditions when moving the drill outside said hole to cool it so as to relieve heat generated in the drill by cutting.

Alternatively, preferably, cutting condition setting means further has a spindle dwell time setting means for setting a time for keeping the drill waiting without cutting until the rotary speed of the spindle reaches a desired rotary speed.

Alternatively, preferably, the cutting region setting means defines a beginning part, an inner part, and a penetration part in accordance with the depth of the hole from the side close to the drill of the workpiece toward a depth direction of the hole in the workpiece.

More preferably, the interference prevention condition setting means sets a clearance between the previous cutting depth position and the current cutting beginning position.

Alternatively, more preferably, the cooling condition setting means sets a waiting time to keep the drill waiting after moving the drill outside of the hole when cutting the plurality of cutting regions.

According to a second aspect of the present invention, there is provided a drilling method including the steps of dividing a hole to be drilled in a workpiece into cutting regions of a beginning part, an inner part, and a penetration part and independently setting cutting conditions for each cutting region, cutting the beginning part based on the cutting conditions for the beginning part; cutting the inner part based on the cutting conditions for the inner part; and cutting the penetration part based on the cutting conditions for the penetration part.

Preferably, the step of dividing the hole and setting cutting conditions includes a step of independently setting at least one of one depth of out of the drill, a cutting feed speed of the drill, a rotary speed of the drill, and a non-cutting feed speed of the drill for each cutting region.

Preferably, at least one of the steps has at least one of a step of starting the cutting by the drill from a previous cutting depth position a predetermined distance away when drilling the hole by a plurality of cuttings by a predetermined depth of cut and a step of moving the drill outside the hole after cutting by the predetermined depth of out and cooling the drill by idle spinning for a predetermined time.

Preferably, the step of cutting the penetration part has a step of reducing the rotary speed of the drill from that in the steps of cutting the beginning part and the inner part.

Preferably, the step of setting the cutting conditions has a step of independently setting for each cutting region at least one of one depth of out of the drill, a cutting feed speed of the drill, a rotary speed of the drill, and a non-cutting feed speed of the drill.

BRIEF DESCRIPTION OF THE DRAWINGS

The above and other objects and features of the present invention will be described in more detail with reference to the accompanying drawings, in which:

FIG. 2 is a block diagram of an NC apparatus as an embodiment of a control apparatus for a drilling machine according to the present invention;

FIG. 3 is a view of a hardware configuration of the NC apparatus shown in FIG. 2;

FIG. 7 is a view of parameters defined for drilling in the NC apparatus according to an embodiment of the present invention;

FIGS. 8A to 8C are views illustrating a method of drilling a hole according to the embodiment;

FIG. 9 is a view of the path of movement of a drill based on parameters defined in the NC apparatus when drilling a through hole;

FIG. 10 is a flow chart for explaining a method of drilling a hole according to an embodiment of the present invention;

FIG. 11 is a flow chart of an example of a procedure for drilling a beginning part;

FIG. 14 is an example of a NC program for drilling the beginning part;

FIG. 15 is an example of a NC program for drilling the inner part; and

FIG. 16 is an example of a NC program for drilling the penetration part.

DESCRIPTION OF THE PREFERRED EMBODIMENTS

Figure 1A:
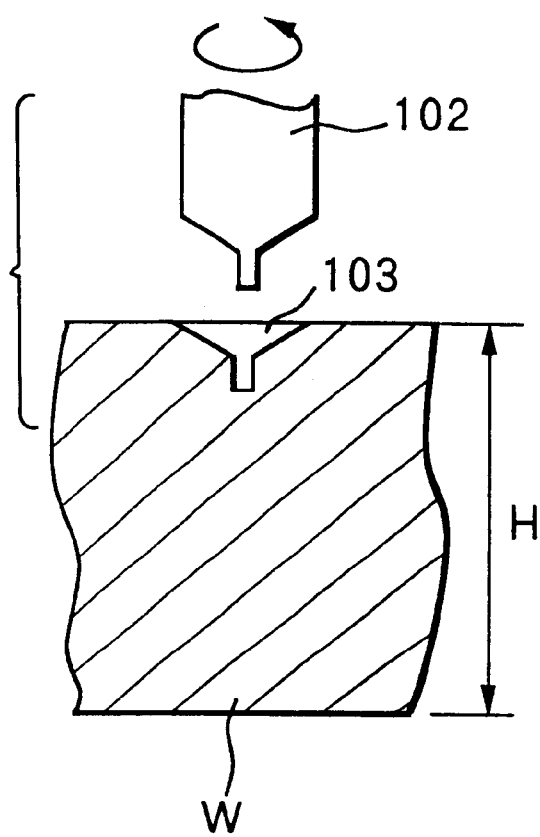
FIGS. 1A and 1B are views illustrating an example of a drilling method of the related art.
Figure 1B:
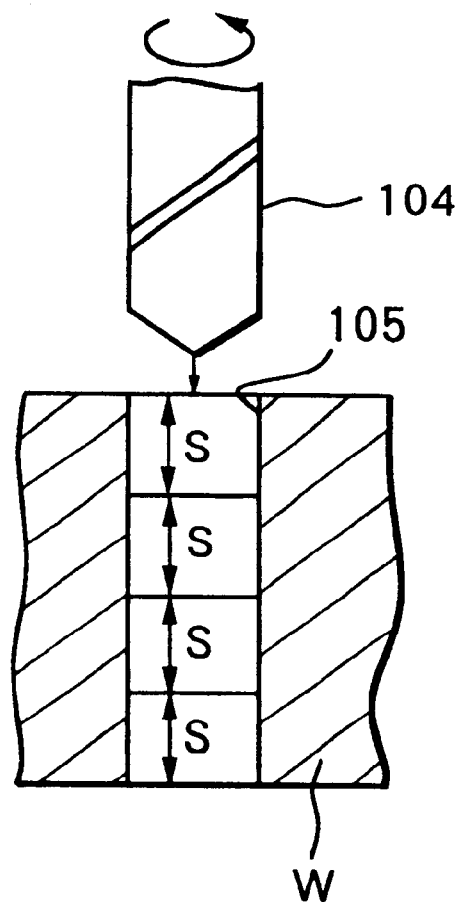

Below, a detailed explanation will be given of preferred embodiments of the present invention with reference to the drawings.

First Embodiment

FIG. 2 is a block diagram of an NC apparatus as an embodiment of a control apparatus for a drilling machine according to the present invention.

The NC apparatus 1 illustrated in FIG. 2 has a main control unit 3, a cutting condition setting/storage unit 5, a machining program storage unit 7, a servo control unit 9, a servo driver 11, a spindle control unit 15, and a spindle driver 17.

The main control unit 3 analyzes (decodes) and processes the NC program defining the cutter location data of the rotary tool for machining the workpiece etc. by a predetermined language, converts the cutter location data to position commands for movement in the control axes, outputs these to the servo control unit 9, generates speed commands for rotating the spindle motor 19 according to the NC program, and outputs the same to the spindle control unit 19.

The main control unit 3 generates control data in accordance with the various cutting conditions stored in the cutting condition setting/storage unit 5.

The machining program storage unit 7 stores the NC program which defines for example the cutter location data etc. for machining the workpiece by a predetermined language.

In the present embodiment, the machining program storage unit 7 stores a program for the drilling described by a G-code as shown in FIGS. 14 to 16.

The servo control unit 9 is comprised of a position control loop, a speed control loop, and a current control loop.

The position control loop receives the position command (amount of movement) on a control axis, performs proportional operations on the errors between these amounts of movement and the position feedback signals from a rotational position detector 13a detecting the rotational position of the servo motor 13, and outputs the same as speed commands to the speed control loop.

The velocity control loop performs proportional operations and integration operations on the errors between the speed commands and the difference values (speed feedback signals) for each sampling time of the position feedback signals from the rotational position detector 13a to generate torque commands and outputs the same to the current control loop.

The current control loop performs proportional operations on the errors between the output torque signal of the servo motor 13 obtained by conversion from the drive current of the servo motor 13 and the torque commands to generate current commands, converts these to predetermined electrical signals, and outputs these to the servo driver 11.

The servo driver 11 outputs a drive current which amplifies the current command from the servo control unit 9 to the servo motor 13.

The servo motor 13 is driven in accordance with the drive current.

The rotary position sensor 13a provided in the servo motor 13 outputs detection pulses in accordance with the amount of the rotation of the servo motor 13.

Note that separate servo control units 9, servo drivers 11, and servo motors 13 are necessary for at least the three X-, Y-, and Z-axes in the machining center explained later. Illustration of all of these is omitted in FIG. 2. Further, in the present embodiment, the focus is on the control on the Z-axis. Therefore, the following explanation is made assuming the servo control unit 9. the servo driver 11, and the servo motor 13 are for the Z-axis.

The spindle control unit 15 is comprised of a speed control loop and a current control loop and controls the speed of the spindle motor.

The spindle driver 17 outputs a drive current which amplifies the current command from the spindle control unit 15.

The spindle motor 19 is driven in response to the drive current from the spindle driver 17.

A rotary speed sensor 19a provided in the spindle motor 19 detects a rotary speed of the spindle motor 19 and outputs the detection value to the spindle control unit 15.

Note that in the present embodiment, while the NC apparatus 1 is explained as having the spindle control unit 15 and the spindle driver 17, these can be provided separate from the NC apparatus 1.

The cutting condition setting/storage unit 5 functions to set and store the various cutting conditions in the drilling. Details are given later.

FIG. 3 is a view of an example of the hardware configuration of the NC apparatus 1 illustrated in FIG. 2.

A microprocessor 41 illustrated in FIG. 3 is connected through a bus to a read only memory (RON) 42, a random access memory (RAN) 43, interface circuits 48 and 49, a graphic control circuit 44, a display 45, a keyboard 47, software keys 46, etc.

The microprocessor 41 controls the NC apparatus 1 as a whole according to a system program stored in the ROM 42.

The ROM 42 has stored in it programs for controlling the main unit 3, the cutting condition setting/storage unit 5, the servo control unit 9, and the spindle control unit 15 etc. and a system program for controlling the NC apparatus I as a whole.

The RAM 43 downloads programs stored in the ROM 42, stores various NC programs, data, etc., and, for example, stores the later explained parameters which are set in the cutting condition setting/storage unit 5.

The graphic control circuit 44 converts digital signals to display signals and supplies these to the display 45.

For example, a cathode ray tube (CRT) display or liquid crystal display is used for the display 45.

The display 45 displays shapes, cutting conditions and generated machining programs etc. when an operator prepares the machining programs by a dialog using the software keys 46 or keyboard 47 and displays input data when the operator inputs required data.

The operator can prepare a machining program by inputting data in accordance with the contents displayed on the display 45 (dialog data input screen).

The display 45 displays the operations or data received on the screen by a menu format. Which item is selected in the menu is determined by depressing a software key 46 at the bottom of the menu.

The software keys 46 and the keyboard 47 are also used for inputting data required for the NC apparatus 1.

The interface circuit 48 converts commands such as position commands to the servo motor 13 output from the microprocessor 41 to predetermined signals and outputs these to the servo driver 11.

The interface circuit 49 converts commands such as speed commands to the spindle motor 19 output from the microprocessor 41 to predetermined signals and outputs these to the spindle driver 17.

The interface circuits 48 and 49 count the detection pulses from the rotary position sensor 13a provided for the servo motor 13 and from the rotary speed sensor 19a provided for the spindle motor 19, convert these to predetermined digital signals, and output the same to the microprocessor 41.

Figure 4:
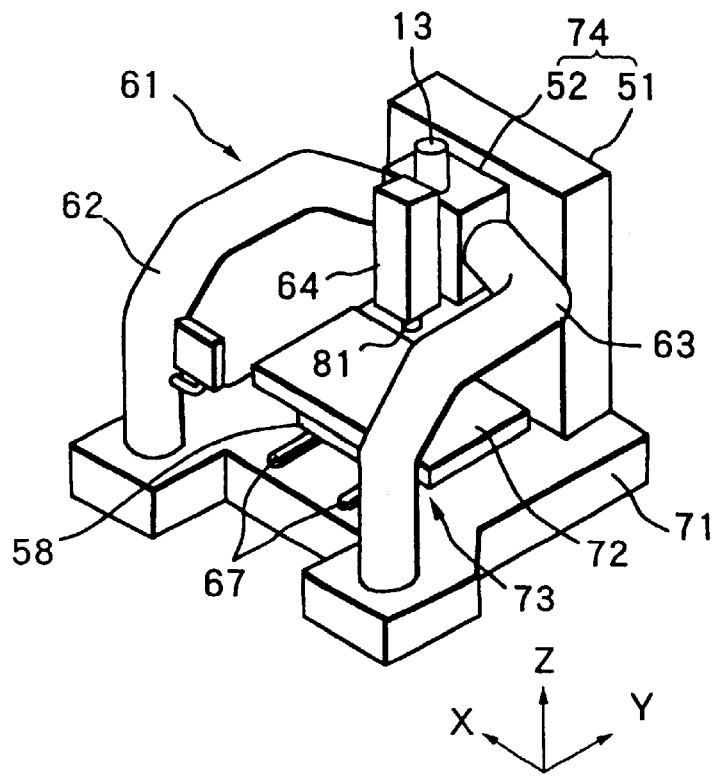
FIG. 4 is a perspective view of an example of a machining center functioning as a drilling machine to which the present invention is applied.
Figure 5:
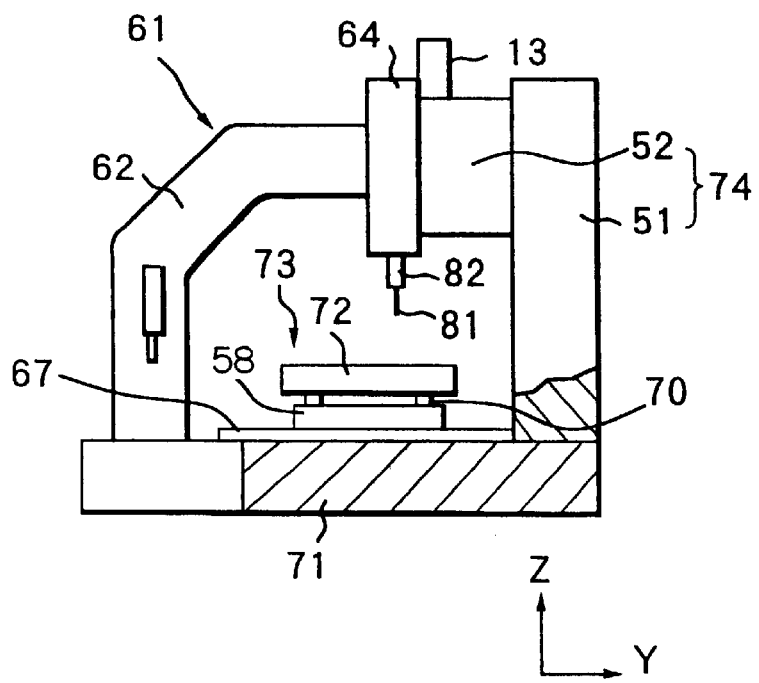
FIG. 5 is a sectional view of the machining center shown in FIG. 4.

FIG. 4 and FIG. 5 are views for explaining an example of a machining center functioning as a drilling machine tool to which the present invention is applied. FIG. 4 is a perspective view, while FIG. 5 is a sectional view.

Note that the machining center illustrated as an NC machine in FIG. 4 and FIG. 5 is controlled by the above NC apparatus.

In the machining center illustrated in FIG. 4 and FIG. 5, a table 72 is arranged on the upper surface of a bed 71 to be movable in the right and left direction (in the X-axis direction) and in the front and rear direction (in the Y-axis directions) by a drive mechanism 73. A column 74 stands at the rear end of the bed 71.

The drive mechanism 73 is comprised of a pair of guide rails 67 which are arranged in parallel to the Y-axis on the bed 71, a Y-axis slider 58 which is arranged movably in the Y-axis direction on the guide rails 67, and a pair of guide rails 70 which are arranged on the Y-axis slider 58 to support movably the table 72 in the direction of the X-axis.

Note that the drive mechanism 73, while not illustrated elsewhere, has a feed mechanism to move the Y-axis slider 58 in the Y-axis direction and a Y-axis servo motor to drive this mechanism and a feed mechanism to move the table 72 in the X-axis direction and an X-axis servo motor to drive this feed mechanism.

The column 74 has a vertical column part 51 standing vertically at the rear end of the bed 71 and a horizontal column part 52 integrally fixed to the top front of the vertical column part 51.

On the horizontal column part 52, a spindle head 64 is arranged movably up and down (movably in the Z-axis direction). A feed mechanism (not illustrated) and the Z-axis servo motor 13 are provided to move the spindle head 64 up and down.

The spindle head 64 has built into it a spindle 82 supported rotatably and the spindle motor 19 (not illustrated) to drive this spindle 82. The spindle motor 19 drives a drill 81 attached to the front end of the spindle 82 attached to the spindle head 64.

The upper part of the column 74 and the front end of the bed are connected by a support 61. The support 61 Is comprised of a pair of support parts 62 and 63. The pair of support parts 62 and 63 connect the two sides of the upper part of the column 74 (two sides of the horizontal column part 52) and the two sides of the front end of the bed 71. The distance between the support parts 62 and 63 becomes gradually wider from the two upper sides of the column 74 toward the two front end sides of the bed 71.

In the above machining center, the X-, Y-, and Z-axis servo motors 13 and spindle motors 19 are driven by the above NC apparatus 1.

Specifically, the NC apparatus 1 drives the spindle motor 19 at a predetermined rotary speed to rotate the drill 81, drives the X- and Y-axis servo motors to control the positions of the table 72 by the drive mechanism 73 in the X- and Y-axis directions, and drives the Z-axis servo motor 13 to control the Z-axis position of the spindle head 64 and perform the drilling in the workpiece on the table 72 by the drill 81.

Here, an explanation will be given of the basic procedure in the method of drilling a hole according to the present embodiment.

FIGS. 8A to 8C are views illustrating the method of drilling of hole according to the present embodiment.

As illustrated in FIG. 8A, the beginning part (below defined as the "cutting region 1") extending from the surface of the workpiece W having a thickness H down to a depth h1 is drilled by cutting by the drill 81 by a predetermined depth of out a required number of times.

Next, as illustrated in FIG. 8B, the inner part of the workpiece W (below defined as the "cutting region 2") extending through the cutting region 1 down to the depth h2 is drilled by cutting by a predetermined depth of cut in a required number of times.

Next, as illustrated in FIG. 8C, the penetration part of the workpiece W (below defined as the "cutting region 3") extending through the cutting regions 1 and 2 down to the depth h3 is drilled by the drill 81 by cutting by a predetermined depth of cut a required number.

The above NC apparatus 1 is provided with separate cutting condition setting/storage units 5 for the cutting regions 1 to 3 for performing the drilling explained in FIG. 8.

Figure 6:
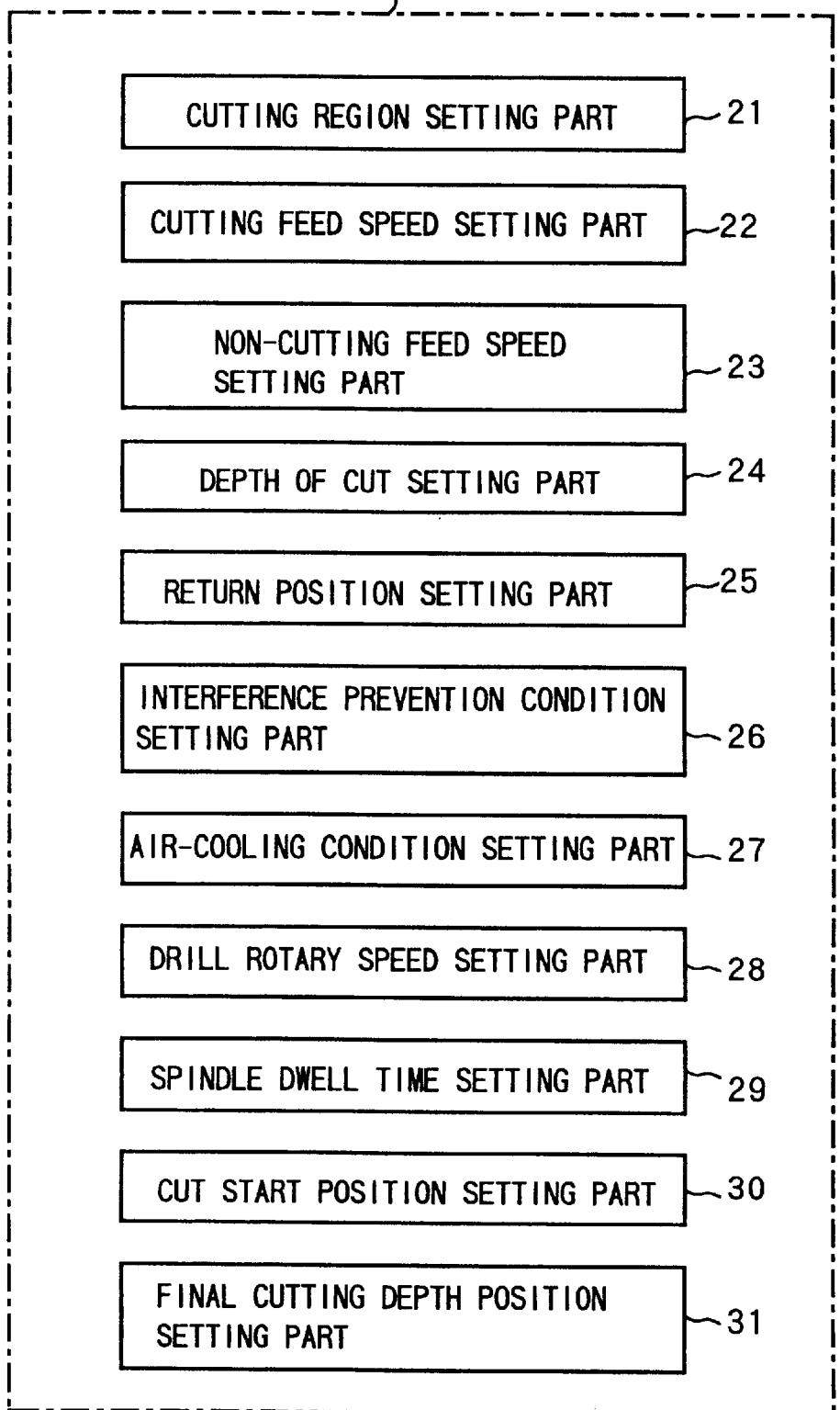
FIG. 6 is a view of an example of the configuration of a cutting condition setting/storage unit 5 in the NC apparatus.

FIG. 6 is a view of the configuration of the cutting condition setting/storage unit 5 of the above NC apparatus 1.

The cutting condition setting/storage unit 5 has a cutting region setting part 21, a cutting feed speed setting part 22, a non-cutting feed speed setting part 23, a depth of cut setting part 24, a return position setting part 25, an interference prevention condition setting part 26, an air-cooling condition setting part 27, a drill rotary speed setting part 28, a spindle dwell time setting part 29, a cut start position setting part 30, and a final cutting depth position setting part 31.

The cutting region setting part 21 sets two or more cutting regions in accordance with the depth of the drilling hole.

Specifically, when drilling a through hole in a workpiece, the cutting regions are defined as, from the surface of the workpiece toward the inside of the workpiece, the beginning part, the inner part, and the penetration part in accordance with the depth of the drilling hole.

The extent of each region is set from experience, the material of the workpiece, etc.

The cutting feed speed setting part 22 sets the feed speed of the drill when cutting at each cutting region.

For example, when drilling a through hole, it is possible to set different feed speeds of the drill at the regions 1 to 3.

The feed speeds of the drill are also set from experience, the material of the workpiece, etc.

The non-cutting feed speed setting part 23 sets the feed speed of the drill at the time of rapid feed (non-cutting).

This rapid feed speed is set to an optimal value in consideration with the interference between the machined hole and the drill etc. when the drill is moving in the hole already formed.

The depth of cut setting part 24 sets the depth of out of the drill at one operation in each cutting region.

For example, when drilling a through hole, it is possible to set a different depth of cut for each region 1 to 3.

The return position setting part 25 sets the moving position for moving the drill outside of the hole after cutting by the predetermined depth of out in each cutting region.

The interference prevention condition setting part 26 sets clearances between the previous cut-in position and the current cutting start position when repeatedly cutting by the predetermined depth of cut in each cutting region.

By setting these clearances, it becomes possible to prevent interference between the hole and the drill when the drill is moving in the hole.

The air-cooling condition setting part 27 sets the air-cooling time for cooling the drill by idle spinning at a movement position set in the return position setting part 24 when repeatedly cutting by the predetermined depth of cut.

The drill rotary speed setting part 28 independently sets the rotary speed of the drill at each cutting region.

The spindle dwell time setting part 29 sets the dwell time required when starting the cutting to make the rotary speed of the spindle motor 19 stable after reaching the rotary speed set by drill rotary speed setting part 28.

The cutting start position setting part 30 sets the starting position of the cutting by the drill.

The final cutting depth position setting part 31 sets the final movement position of the drill to the workpiece in the depth direction.

By this final movement position, it is possible to determine whether the hole drilled into the workpiece is a through hole or a blind hole.

In the present embodiment, the above cutting condition setting/storage unit 5 specifically sets the values of parameters defined in the NC apparatus 1 shown in FIG. 7.

The input and change of the values of the parameters is performed by an operator by the keyboard 47 or software keys 45 while looking at the display 45.

The parameter V42 is for setting the boundary position between the cutting regions 1 and 2.

Various kinds of cutting conditions are independently set for the cutting regions 1 and 2 separated by this boundary position.

The parameter V43 is for setting the boundary position of the cutting regions 2 and 3.

Various kinds of the cutting conditions are independently set for the cutting regions 2 and 3 separated by this boundary position.

By defining the parameters V42 and V43 in the NC apparatus 1, the settings in the above cutting region setting part are comprised.

The parameter V35 sets the feed speed of the rapid feed of the drill in the Z-axis direction.

By defining this parameter V35, the setting of the non-cutting feed speed setting part 23 is comprised.

Note that in the present embodiment, the rapid feed speed is set to the same value in each of the cutting regions 1 to 3, but also can be set to different values in the regions 1 to 3.

The parameter V41 is for setting the clearance between the previous cutting position and the current cutting position.

By defining the parameter V41 in the NC apparatus 1, the setting in the above interference prevention condition setting part 26 is comprised.

Note that it is possible to set different clearances for each cutting region 1 to 3.

The parameter V39 is for setting the program starting position, that is, the cutting start position.

By defining the parameter V39 in the NC apparatus 1, the setting in the above cutting start position setting part 30 is comprised.

The parameter V40 is for setting the movement position to move the drill outside of the machined hole after cutting by the defined depth of cut when cutting the cutting regions 2 and 3.

By defining the parameter V40 in the NC apparatus, the setting in the above return position setting part 25 is comprised.

Note that in the present embodiment, the return position when cutting the cutting region 1 is not set, but it is also possible to set it.

Further, in the present embodiment, the return position when cutting the cutting regions 2 and 3 is set to the same position, but it is also possible to set the same to different positions.

The parameter V51 is for setting the rotary speed of the drill when cutting the cutting regions 1 and 2.

The parameter V53 is for setting the rotary speed of the drill when cutting the cutting region 3.

The parameter V54 is for setting the coefficient to determine the parameter V53 from the parameter V51.

That is, in the present embodiment, the rotary speeds of the drill when cutting the cutting regions 1 and 2 are set to the same value, and the rotary speed of the drill when cutting the cutting region 3 is proportionally determined (with reference to this rotary speed).

By defining the parameters V51, V52, and V54 in the NC apparatus 1, the setting in the above drill rotary speed setting part 28 is comprised.

The parameter V60 is for setting the cooling time (dwell time) to cool the drill by idle spinning.

By defining the parameter V60 in the NC apparatus 1, the setting in the above cooling condition setting part 27 is comprised.

The parameter V52 is for setting the waiting time until the rotary speed of the spindle motor 19 reaches a set rotary speed and becomes stable.

By defining the parameter V52 in the NC apparatus 1, the setting in the above spindle dwell time setting part 24 is comprised.

The parameter V37 is for setting the one depth of out of the drill when cutting the cutting region 1.

The parameter V36 is for setting one depth of cut of the drill when cutting the cutting region 2.

The parameter V38 is for setting one depth of cut of the drill when cutting the cutting region 3.

By defining respectively the parameters V37, V36, and V38 in the NC apparatus 1, the settings in the above depth of cut setting part 24 are comprised.

The parameter V33 is for setting the cutting feed speed of the drill when cutting the cutting region 1.

The parameter V32 is for setting the cutting feed speed of the drill when cutting the cutting region 2.

The parameter V34 is for setting the cutting feed speed when cutting the cutting region 3.

By defining the parameters V33, V32, and V34 in the NC apparatus 1, the settings of the above cutting feed speed setting part 22 is comprised.

The parameter V45 is for setting the final movement position in the cutting depth direction toward the workpiece.

By defining the parameter V45 in the NC apparatus 1, the setting in the above final cutting depth position setting part 31 is comprised.

Next, an explanation will be given of an example of drilling a through hole by the above NC apparatus and machining center.

FIG. 9 is a view for explaining the path of movement of the drill in accordance with the above parameters defined in the NC apparatus 1 when drilling a through hole. Further, FIGS. 10 to 13 are flow charts showing the cutting process of the through hole.

Furthermore, FIGS. 14 to 16 are examples of NC programs used for the drilling.

Below, an explanation will be given with reference to FIGS. 9 to 16.

As illustrated in FIG. 10, the drilling process of a through hole according to the present embodiment includes the steps of setting the cutting conditions (step S101), drilling the beginning part (step S102), drilling the inner part (step S103), and drilling the penetration part (step S104).

Setting of Cutting Conditions (Step S101)

First, the drilling mode of the NC apparatus 1 is set by the keyboard 47 or software keys 46, an NC program stored in the machining program storage unit 7 shown in FIGS. 14 to 16 is read out to the main control unit 3, and the various parameters defined in the above NC apparatus 1 are set.

The cutting conditions when for example drilling a through hole in a stainless steel plate of 1.1 mm thickness by a drill having a 0.1 m diameter are set to, as shown at the sides of the parameter names of FIG. 7, V35=500 mm/min, V41=0.1 mm, V39=0.5 mm, V40=3.0 mm. V51=10000 rpm, V53=5000 rpm, V54=0.5, V60=1 sec, V52=12 sec, V37= 0.01 sec, V33=5 mm/min, V42=-0.25 mm, V36=0.01 mm, V32=7 mm/min, V43=-0.95 mm, V38=0.01 mm, V34=3 mm/min, and V45=-1.3 mm.

Next, the hole starts to be drilled into the workpiece.

The main control unit 3 of the NC apparatus 1 drives the machining center based on the read-out NC program and the various parameters.

Machining of Beginning Part (Step S102)

FIG. 11 and FIG. 14 are a flow chart and NC program showing the cutting of the cutting region 1.

First, the drill 81 (spindle) is driven at the rotary speed defined by the parameter V51 (step S1). The code S of the program P1 instructs the rotary speed (rpm) of the spindle.

Next, the time defined by the parameter V52 until the spindle rotary speed reaches the rotary speed defined by the parameter V51 and becomes stable is waited (step 2). The code G04P of the program P2 instructs the stopping of the drill 81.

Therefore, the rotary speed of the drill 81 becomes stabilized.

Next, as shown in FIG. 9, the drill 81 is moved to the cutting start position P1 (absolute position) defined by the parameter V39 at the rapid feed speed defined by the parameter V35 (step S3). This is handled by the program P3.

The code G90 instructs the absolute position, the code G1 instructs the feed, and the code F instructs the feed speed.

Next, the movement position for the cutting by the drill 81 is determined (step S4). This is handled by the programs P4 and P5.

The parameter V50 defines an absolute position for the drill 81 to move, the program P4 initializes the parameter V50, and the program P5 determines the parameter V50 from the parameters V39, V41, and V37.

That is, the determined movement position (V50) of the drill 81 is a position away from the cutting start position P1 by the distance of one cutting by the depth of cut defined by the parameter V37 and the clearance in the −Z-axis direction.

Next, the drill 81 is fed for cutting (to the determined movement position (V50) of the drill 81) at the cutting feed speed defined by the parameter V33 (step S5). As a result, the drilling of the region 1 is started. This is handled by the program P6.

Next, the drill 81 1s moved by the clearance defined by the parameter V41 in the +Z-axis direction (step S6). This is handled by the program P7.

Next, the movement position for cutting by the drill 81 is updated (step S7), and the cutting is repeated (step S8). This is handled by the programs P8 and P9.

In this process, at step S6, the drill 81 is moved by the clearance in the +Z-axis direction, then cutting is repeated by the drill 81 from that movement position, so breakage of the drill 81 by interference between the hole and drill 81 is suppressed.

That is, if the drill 81 is moved by the clearance, then the drill 81 is rapidly moved to the previous cut-in position, the drill 81 easily breaks due to interference between the drill 81 and the hole, but if this movement is performed at the cutting feed speed defined by the parameter V33, the interference between the drill 81 and the hole is suppressed.

Next, it is judged if the not-cut part (remaining part) of the cutting region 1 is larger than the depth of out defined by the parameter V37 (step S9). This is handled by the program P10. Note that the code LE of the program P10 indicates ≧, while the code Goll indicates to jump to the label N1.

If the non-cut part of the cutting region 1 is smaller than the depth of cut defined by the parameter V37, it means that the cutting region 1 is close to being finished.

In this case, the drill 81 is moved by exactly the clearance in the +Z-axis direction (step 10). then the drill 81 is fed for cutting to the boundary position between the cutting regions 1 and 2 (step S11) defined by the parameter V42, and the cutting of the cutting region 2 is proceeded to (step S12). The steps S10 to S12 are handled by the programs P13 to P16.

Note that the program initializes the system for preparation for drilling the cutting region 2 by inserting the parameter V42 defining the boundary position P2 between the cutting regions 1 and 2 instead of the parameter V50.

If the non-out part of the cutting region 1 is larger than the depth of cut defined by the parameter V37, it is judged whether the present cutting depth position (V50) is in the cutting region 1 or not (step S13). This Is handled by the program P11.

If the present position of the drill 81 is in the cutting region 1, step S6 is returned to again and the above steps S6 to S9 are repeated.

If the present position of the drill 81 is outside of the cutting region 1, the drilling of the cutting region 2 is proceeded to.

The drill 81 successively cuts the cutting region 1 while moving along the path shown in FIG. 9.

Machining of Inner Part (Step S103)

Figure 12:
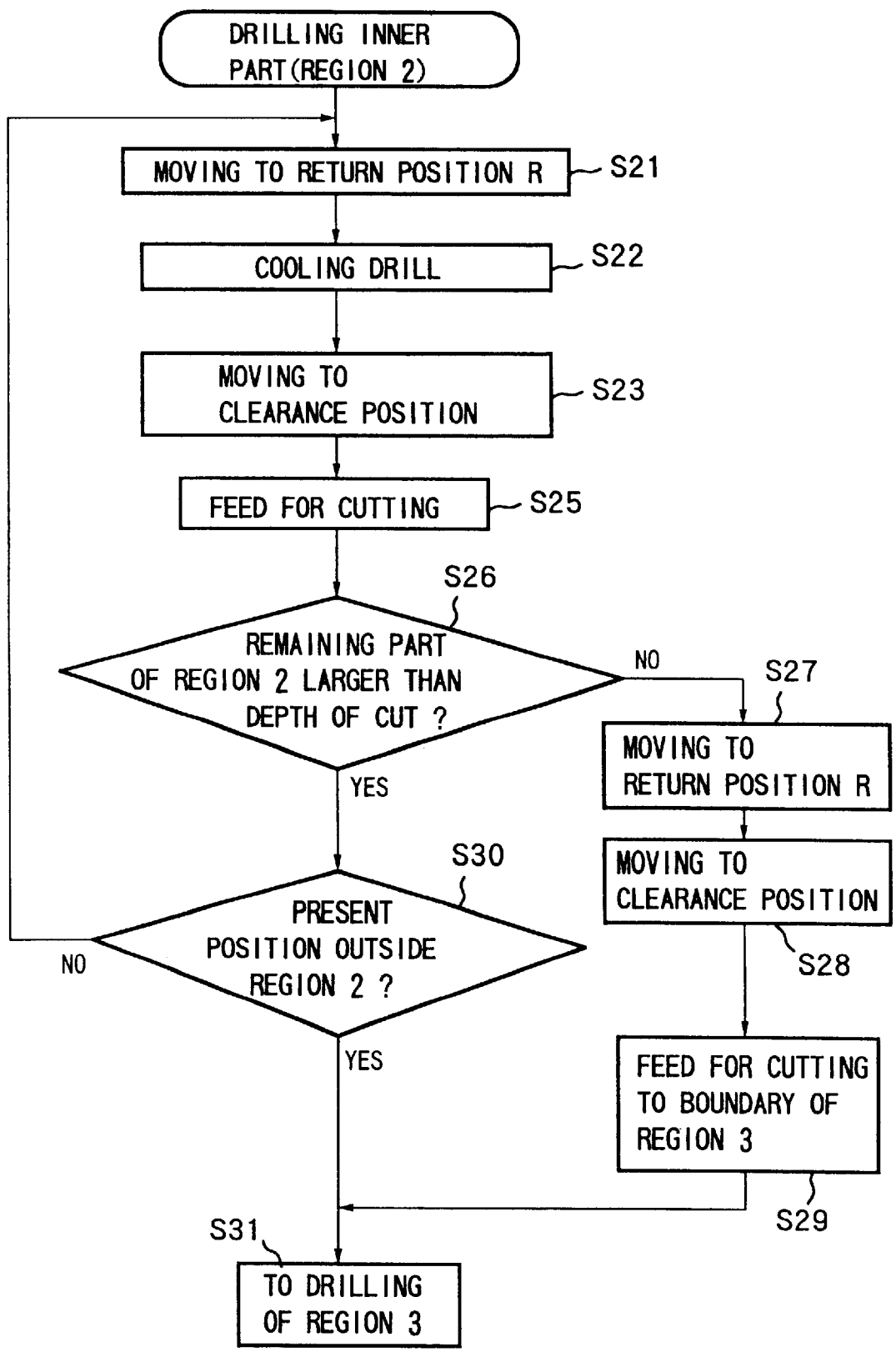
FIG. 12 is a flow chart of an example of a procedure for drilling an inner part.

Next, an explanation will be given of the process for drilling the inner part with reference to the flow chart shown in FIG. 12 and the NC program shown in FIG. 15.

The drill 81 is positioned at the boundary position P2 between the cutting regions 1 and 2 when finishing the drilling of the cutting region 1.

First, the drill 81 in this state is rapidly moved to the return position R defined by the parameter V40 (step S21). This is handled by the program 21.

By moving the drill 81 to the return position R, it becomes possible to remove the chips from the hole and cool the drill 81.

Next, the drill 81 is cooled by idle spinning at the return position R for the cooling time defined by the parameter V60 (step S22). This is handled by the program P22.

In particular, when the workpiece is made of stainless steel plate or another heat resistant steel, the drill 81 easily becomes heated. By cooling the drill 81, breakage of the drill 81 by the heat can be prevented.

Next, the drill 81 is rapidly moved from the return position to the cutting start position, that is, the position of exactly the clearance in the +Z-axis direction from the boundary position P2 (below defined as the "clearance position") (step S23). This is handled by the program P23.

Next, the drill is fed for cutting at the feed speed in the cutting region 2 defined by the parameter V32 and by the one depth of out defined by the parameter V36 (step S25). This is handled by the programs P23 to P25.

Next, it is judged whether the non-cut part of the cutting region 2 is larger than the depth of out defined by the parameter V37 (step S26). This is handled by the program P26.

If the non-cut part of the cutting region 2 is larger than the depth of cut, it is judged whether the present cutting position (V50) of the drill 81 is in the cutting region 2 or not (step S30).

If the present cutting position is in the cutting region 2, step S21 is returned to again and the above process is repeated.

If the cutting depth position of the drill 81 is outside of the cutting region 2, the drilling of the cutting region 3 (step S31) is proceeded to. Steps S26 to S31 are handled by the programs P26 to P28.

If the non-cut part of the cutting region 2 is smaller than the depth of cut defined by the parameter V37 at step S26, the drill 81 is rapidly moved to the return position R, the drill 81 is rapidly moved to a position away from the previous cutting depth position by exactly the clearance in the +Z-axis direction (below defined as the "clearance positions" (step S28), and the drill 81 is fed for cutting to the boundary position P3 between the cutting regions 2 and 3 defined by the parameter V43 (step S29). These steps are handled by the programs P29 to P33.

The drill 81 successively cuts the cutting region 2 while moving along the path shown in FIG. 9.

Machining of Penetration Part (Step S104)

Next, an explanation will be given of the process for drilling the penetration part with reference to the flow chart shown in FIG. 13 and the NC program shown in FIG. 16.

Figure 13:
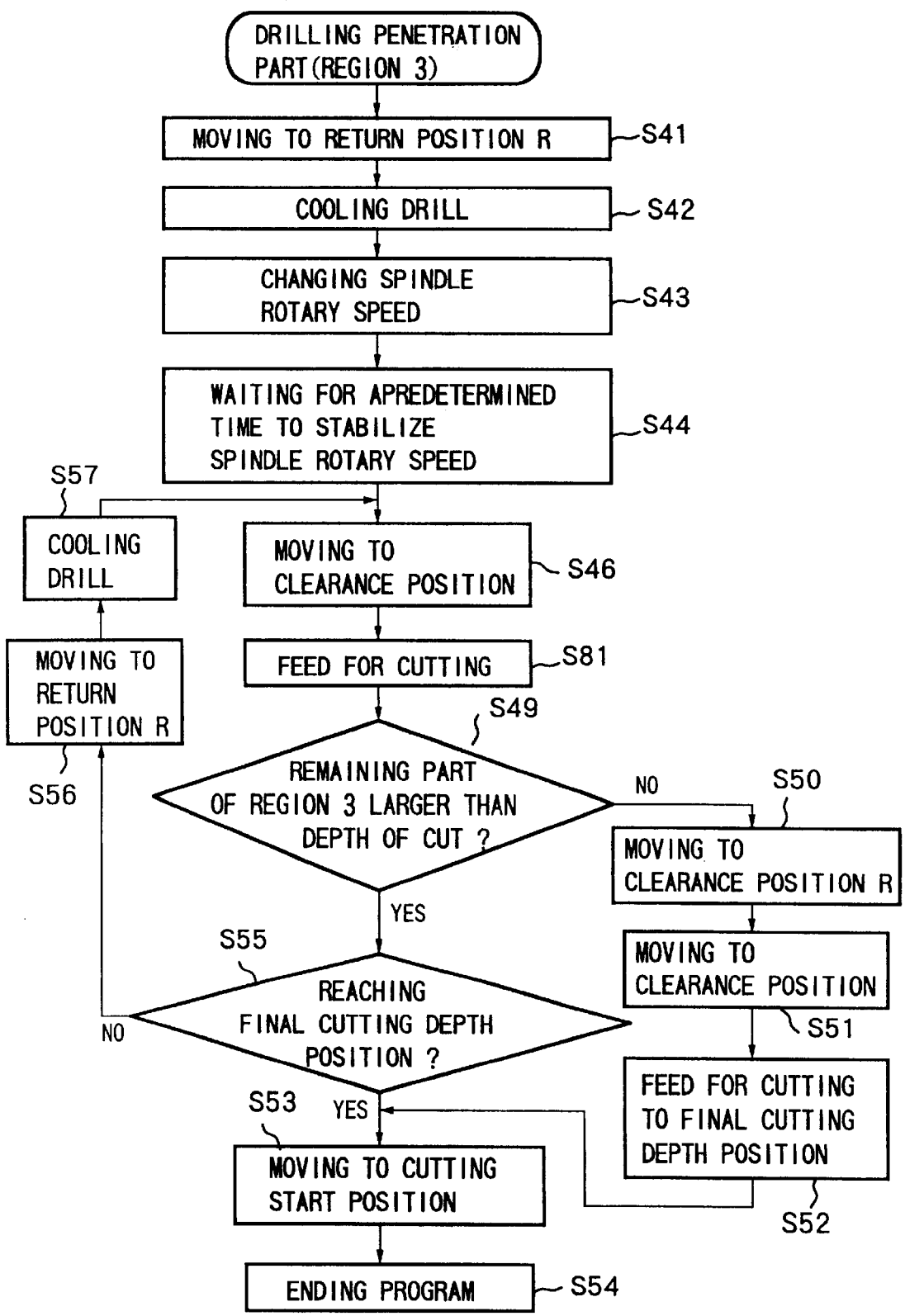
FIG. 13 is a flow chart of an example of a procedure for drilling a penetration part.

FIGS. 13 and 16 show a flow chart and NC program for drilling the cutting region 3.

The drill 81 is positioned at the boundary position P3 between the cutting regions 2 and 3 when the cutting region 2 finishes being drilled.

First, the drill 81 in this state is rapidly moved to the return position R defined by the parameter V40 (step S41). This is handled by the program P41.

Next, the drill 81 is cooled by idle spinning for a predetermined time (step S42), then the rotary speed (rpm) of the drill 81 (spindle) is changed (step S43). This is handled by the programs P43 and P44.

Specifically, for example, under the above cutting conditions, the speed is reduced from 10,000 rpm to 5,000 rpm.

The reason for reduction of the rotary speed of the drill 81 at the cutting region 3 is for preventing the drill 81 from shifting from the center of the hole and breaking when the diameter of the drill 81 is smaller than for example 0.5 mm.

Next, the drill 81 is made to wait for a predetermined time until the rotary speed of the spindle becomes stable (step S45), then the drill 81 is rapidly moved to the clearance position, that is, the position located away from the boundary position P3 between the cutting regions 2 and 3 by exactly the clearance in the +Z-axis direction (step S48). This is handled by the program P48.

Next, the drill 81 is moved for cutting by the one depth of out defined by the parameter V38 in the cutting region 3 and at the feed speed for cutting defined by the parameter V34 (step S48). This is handled by the programs P49 and P50.

Next, it is judged if the non-cut part (remaining part) of the cutting region 3 is larger than one depth of cut defined by the parameter V38 (step S49). This is handled by the program P51.

If the non-cut part of the cutting region 3 is larger than one depth of cut, it is judged whether the present cutting position (V50) has reached the final cutting depth position E (step S55).

If the drill has not yet reached the position E, the drill 81 is rapidly moved to the return position R (step S56), the drill 81 is cooled for a predetermined time (step S57), the step S46 is returned to again, and the above process is repeated. This is handled by the programs P52, P53, P46, and P47.

If the cutting depth position of the drill 81 has reached the final cutting depth position E, the drill 81 is rapidly moved to the cutting start position P1 (step S53) and the program is ended (step S54). This is handled by the programs P58 and P59.

If the non-cut part of the cutting region 3 is smaller than one depth of cut at step S49, the drill 81 is rapidly moved to the return position R (step S50), the drill 81 is moved to the clearance position (step S51), and the drill 81 is fed for cutting to the final cutting depth position E (step S52). This is handled by the programs P54 to P58.

The drill 81 successively cuts the cutting region 3 while moving along the path shown in FIG. 9. As a result, the through hole finishes being drilled.

According to the present embodiment, it is possible to set various cutting conditions for the cutting regions 1 to 3, that is, the beginning part, inside part, and penetration part, by the cutting condition setting/storage unit 5 and therefore suitably perform the drilling by a small diameter drill.

Further, according to the NC apparatus 1 of the present embodiment, when drilling by the small diameter drill, it is not necessary to prepare the NC program especially for the drilling, so it becomes possible to rapidly perform the drilling.

Furthermore, according to the present embodiment, when repeatedly cutting by a predetermined depth of cut, by setting the clearance, it becomes possible to suppress the interference between the hole and the drill 81 and as a result it becomes possible to avoid the breakage of the drill 81 when the drill 81 is small in diameter.

According to the present embodiment, further, in the cutting regions 2 and 3 of the inner part and the penetration part, when repeatedly cutting by the predetermined depth of cut, the drill 81 is rapidly moved to the return position R and cooled for a predetermined time, so it becomes possible to prevent the breakage of the drill 81 by heat. This is especially effective when drilling a heat-resistant steel.

According to the present embodiment, further, in the cutting region 3 of the penetration part, it is possible to reduce the rotary speed of the drill 81 from those of the other cutting regions 1 and 2, so it becomes possible to prevent breakage of the drill 81 at the time of penetrating through the workpiece.

Note that while the present embodiment was explained with reference to a machining center as the drilling machine, the present invention may also be applied to any other NC machine tool having a spindle to which a drill may be attached.

Further the present invention may also be applied to not only a general purpose machine tool but also a special purpose machine tool for only drilling.

In the present embodiment, further, although the explanation was made of only the case of drilling a through hole, the present invention can be applied to drilling a blind hole comprising only the beginning part and the inner part.

Further, the NC apparatus according to the present embodiment can be used not only for drilling using a small diameter drill, but also drilling of a large diameter hole and therefore can perform drilling of a wide range of diameters.

What is claimed is:

1. A control apparatus for a drilling machine including means for rotating and moving a small diameter drill, said rotating and moving means rotates the small diameter drill and moves the small diameter drill to a work piece, said control apparatus comprising:

first control means for controlling said rotating and moving means so that the small diameter drill is rotating at a first rotating speed, and the small diameter drill is moved to the work piece at a first cutting feed speed by a predetermined depth of cut until a position of the small diameter drill inserted into the work piece reaches a first position from a top surface of the work piece;

second control means for controlling said rotating and moving means so that the small diameter drill is rotating at a second rotating speed, and the small diameter drill is moved to the work piece at a second cutting feed speed by a predetermined depth of cut until a position of the small diameter drill inserted into the work piece reaches a second position from the first position of the work piece; and third control means for controlling said rotating and moving means so that the rotating speed of the small diameter drill is reduced to a third rotating speed which is lower than the first and second rotating speeds, and the small diameter drill is moved to the work piece at a third cutting feed speed by a predetermined depth of cut until a position of the small diameter drill inserted into the work piece reaches a third position passing through a bottom surface of the work piece from the second position of the work piece.

2. A control apparatus as set forth in claim 1, wherein said third cutting feed speed is lower than said first cutting feed speed and said second cutting feed speed.

3. A control apparatus as set forth in claim 1, wherein said first control means is arranged to make motions of advancing the small diameter drill to the work piece at the first cutting feed speed by a predetermined depth of cut and a predetermined clearance, is arranged to reverse the small diameter drill by the clearance, and is arranged to advance the small diameter drill at the first cutting feed speed by the depth of cut and the clearance again until a position of the small diameter drill reaches the first position.

4. A control apparatus as set forth in claim 1, wherein said second control means is arranged to make motions of advancing the small diameter drill to the work piece at the second cutting feed speed by a predetermined depth of cut and a predetermined clearance, is arranged to reverse the small diameter drill outside of the work piece, is arranged to advance to a position reversed by the clearance from the last position of the small diameter drill inserted into the work piece, and is arranged to advance the small diameter drill again at the second cutting feed speed by the depth of cut and the clearance again until a position of the small diameter drill reaches the second position.

5. A control apparatus as set forth in claim 1, wherein said third control means is arranged to make motions of advancing the small diameter drill to the work piece at the third cutting feed speed by a predetermined depth of cut and a predetermined clearance, is arranged to reverse the small diameter drill outside of the work piece, is arranged to advance to a position reversed by the clearance from the last position of the small diameter drill inserted into the work piece, and is arranged to advance the small diameter drill again at the third cutting feed speed by the depth of cut and the clearance again until a position of the small diameter drill reaches the third position.

6. A control apparatus as set forth in claim 1, wherein said work piece is made of heat resistant steel and said second and third control means control idle spinning time for spinning idle the small diameter drill after moving the small diameter drill outside of the work piece to cool the heat generated by cutting the work piece.

7. A drilling machine comprising:
  means for rotating and moving a small diameter drill, said rotating and moving means is arranged to rotate the small diameter drill and to move the small diameter drill to a work piece;
  first control means for controlling said rotating and moving means so that the small diameter drill is rotating at a first rotating speed, and the small diameter drill is moved to the work piece at a first cutting feed speed by a predetermined depth of cut until a position of the small diameter drill inserted into the work piece reaches a first position from a top surface of the work piece;
  second control means for controlling said rotating and moving means so that the small diameter drill is rotating at a second rotating speed, and the small diameter drill is moved to the work piece at a second cutting feed speed by a predetermined depth of cut until a position of the small diameter drill inserted into the work piece reaches a second position from the first position of the work piece; and
  third control means for controlling said rotating and moving means so that the rotating speed of the small diameter drill is reduced to a third rotating speed which is lower than the first and second rotating speeds, and the small diameter drill is moved to the work piece at a third cutting feed speed by a predetermined depth of cut until a position of the small diameter drill inserted into the work piece reaches a third position passing through a bottom surface of the work piece from the second position of the work piece.

8. A drilling method by a small diameter drill, comprising the steps of:
  rotating the small diameter drill at a first rotating speed, and moving the small diameter drill to a work piece at a first cutting speed by a predetermined depth of cut until a position of the small diameter drill inserted into the work piece reaches a first position from a top surface of the work piece;
  rotating the small diameter drill at a second rotating speed, and moving the small diameter drill to the work piece at a second cuffing feed speed by a predetermined depth of cut until a position of the small diameter drill inserted into the work piece reaches a second position from the first position of the work piece; and
  reducing the rotating speed of the small diameter drill to a third rotating speed which is lower than the first and second rotating speeds, and moving the small diameter drill to the work piece at a third cutting feed speed by a predetermined depth of cut until a position of the small diameter drill inserted into the work piece reaches a third position passing through a bottom surface of the work piece from the second position of the work piece.

* * * * *